United States Patent
Lenz et al.

[19]

[11] Patent Number: 5,815,638
[45] Date of Patent: Sep. 29, 1998

[54] PROJECT ESTIMATOR

[75] Inventors: Frederick P. Lenz, East Setauket; Francis Wang, New York, both of N.Y.

[73] Assignee: Client/Server Connection, Ltd., Rye, N.Y.

[21] Appl. No.: 599,359

[22] Filed: Mar. 1, 1996

[51] Int. Cl.$^6$ .................................................. G06F 17/00
[52] U.S. Cl. .............................. 395/21; 395/22; 395/50; 395/60; 395/61
[58] Field of Search ..................................... 364/401, 468, 364/402, 431.01, 281, 152; 395/650, 22, 20, 21, 11

[56] References Cited

U.S. PATENT DOCUMENTS 5,495,430  2/1996  Matsunari et al. ....................... 364/578

OTHER PUBLICATIONS

CS/8000 Product Brochure, Client/Server Connection, Inc., Mt. Kisco, N.Y.
"Getting Started with CS/7000 — A walk–thru for first–time users of CS/7000", Client/Server Connection, Inc., Mt. Kisco, N.Y., 1995.
"CS/7000 — User Guide", Client/Server Connection, Inc., Mt. Kisco, N.Y., 1995.
Haykin, "Neural Networks," MacMillan College Publishing Co., NY, pp. 138–153, Dec. 30, 1994.
Churchland et al. "The Computational Brain," MIT Press, MA pp. 96–102 Dec. 30, 1993.

*Primary Examiner*—Tariq R. Hafiz
*Attorney, Agent, or Firm*—Fenwick & West LLP

[57] ABSTRACT

A system for estimating the effort necessary to complete a project comprises a rule-based expert system including groups of related estimation rules (rule groups) and a question table, a neural network, the neurodes of which represent groups of the detailed tasks (task groups), a rule indirection module for coupling the outputs of the rule-based expert system to selected neurodes, and an inference engine for implementing the rules of the expert system. The expert system, neural network, and rule indirection module are organized as an advisor module, which communicates information between an advisor interface and the question table. Each rule group represents a quantifiable feature of the specific client/server implementation, such as its size or fault tolerance requirements. The inference engine applies the rule groups to user provided data, and each rule group generates an effort factor (EF) that provides a measure of the associated feature's potential impact on the task groups. The rule indirection module couples each effort factor to selected task group neurodes according to influence factors (IF), which represent the correlation between the feature characterized by the rule group and the selected task groups. The influence factors are initially estimated as part of the expert system but may be further optimized by training the estimator using actual measured efforts and efforts estimated by the present invention.

8 Claims, 5 Drawing Sheets

PROJECT ESTIMATOR

RELATED PATENT APPLICATIONS

This patent application is related to co-pending U.S. patent application Ser. No. 08/609,398 entitled "Knowledge Base Advisor", assigned to the same assignee identified herein, and filed on even date herewith.

BACKGROUND OF THE INVENTION

1. Technical Field

This invention relates to systems and methods for estimating the amount of effort, i.e. person hours, person months, etc., necessary to complete a project, and in particular, to systems and methods that employ artificial intelligence techniques for estimating the effort necessary to design and implement client/server computer systems.

2. Background Art

In order to properly plan and budget for any significant project, business managers must make some estimate of the person hours that will be required to complete the project. This allows managers to set staffing levels and develop budgets that are consistent with their companies' strategic, marketing, and financial plans. Currently available methods for estimating the person hours necessary to complete a project are not very accurate. They work best with projects that can be completed with a small number of well defined tasks and their accuracy decreases as the complexity of the projects increase.

The computer industry in general and the software industry in particular are rife with examples of products whose release dates have been rescheduled multiple times. Large scale software development projects, such as new operating system releases, are notorious for missing successive release dates and are among the most visible examples of the problems with current project estimation methods.

Client server computer systems are another example of computer development projects that are notoriously difficult to plan, schedule, and budget. Many companies are very interested in acquiring client server computer systems because the flexibility of client/server systems allows them to be customized to each company's business needs. However, this flexibility also contributes to the complexity of designing and implementing client/server systems.

Some methods are available for estimating the effort required to complete large scale projects such as designing and implementing client/server systems, but none of these provide the accuracy system managers and planners require. One conventional method, function point analysis, requires the project manager to estimate the number of software features, such as screens, interfaces, and the like, that will be needed for a software system and the complexity of these features. The time necessary to develop the software for each feature is adjusted to reflect the feature's complexity and the project effort is taken as the sum of the development time for each feature in the software.

A major flaw in the function point analysis approach is that it is nearly impossible to estimate either the number of features in a software project or their complexity without first developing a detailed plan of the software. Such detailed project plans are usually not generated until a budget has been approved for the project. As a result, estimated number of screens and their complexity are rough approximations at best, and not the basis for reliable estimates of the number of person hours required for a project.

There is thus a need for a reliable system and method for estimating the effort necessary to complete complex software projects, such as the implementation of client/server systems.

SUMMARY OF THE INVENTION

The present invention is a system and method for accurately estimating the person hours necessary to implement a client/server computer system from a set of detailed but generic tasks specified for a client/server system having a selected architecture. The system and method of the present invention customize the generic tasks to reflect user specified properties of the system, such as the development environment, the major applications, size, fault tolerance, and the resources/expertise of the organization implementing the system.

In accordance with the present invention, an advisor module comprises a rule-based expert system, a neural network, the neurodes of which represent groups of the detailed tasks (task groups), and a rule indirection module for coupling the outputs of the rule-based expert system to selected neurodes. The strength of the coupling is determined in part by training the neural network. The advisor module controls data coupling between an advisor interface and the rule based expert system, which further comprises groups of related estimation rules (rule groups) and a question table. An inference engine applies the rules to data provided by a user through the advisor interface. Each rule group represents a quantifiable feature of the specific client/server implementation, such as its size or fault tolerance requirements. In combination with the inference engine, each rule group produces an effort factor (EF) that provides a measure of the associated feature's potential impact on the task groups.

The rule indirection module couples each effort factor to selected task group neurodes according to influence factors (IF), which represent the correlation between the feature characterized by the rule group and the selected task groups. In effect, the rule-indirection module IFs scale EF, the potential impact of a rule group on the implementation, to reflect the correlation between the task group and the feature of the client/server implementation represented by the rule group. The influence factors are initially estimated as part of the expert system but may be further optimized by training the project estimator using actual measured efforts and efforts estimated by the present invention.

DETAILED DESCRIPTION OF THE INVENTION

Figure 1:
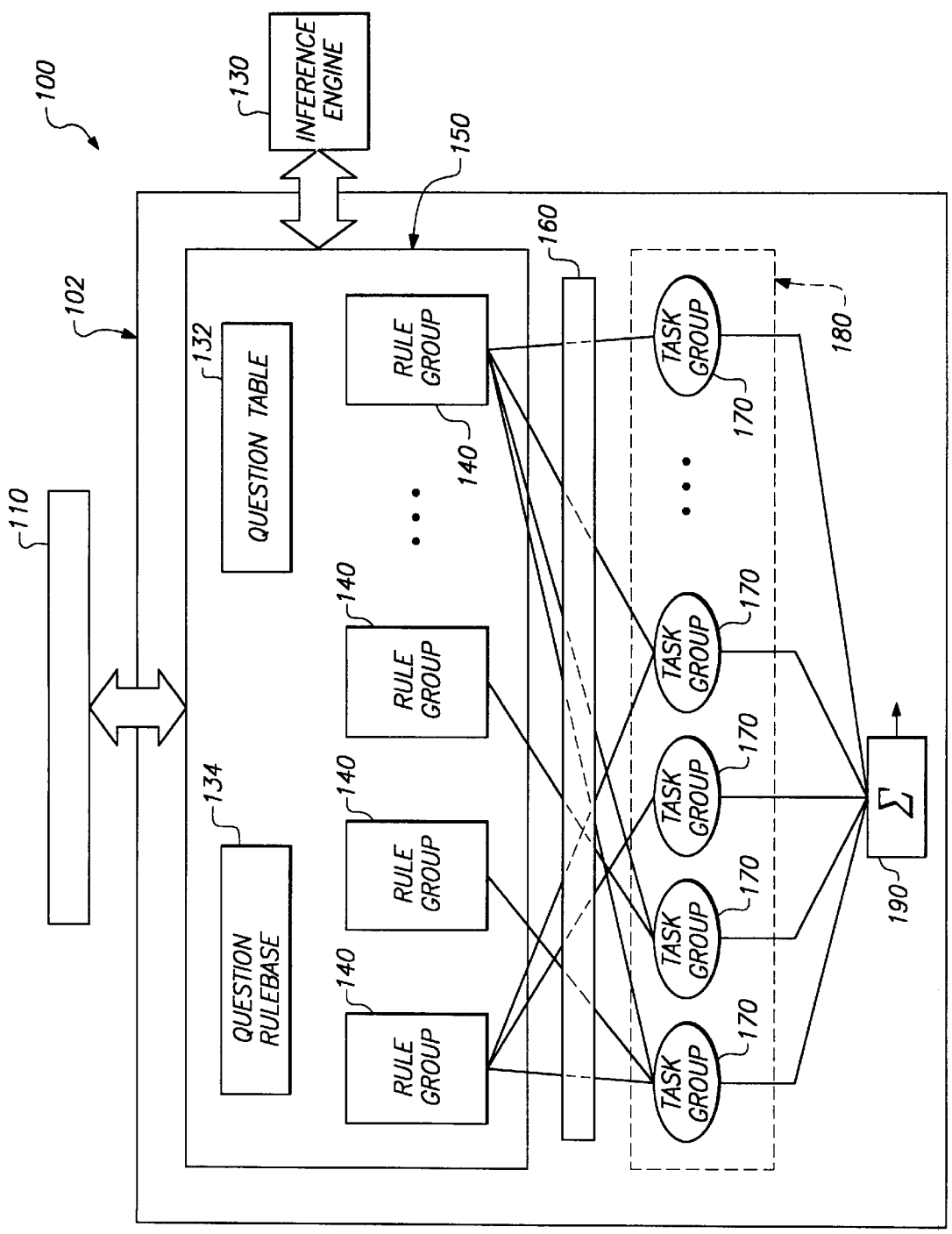
FIG. 1 is a block diagram of the project estimator in accordance with the present invention.

The present invention rationalizes methods for estimating the effort necessary to implement a client/server computer system by explicitly taking into account the objective set of tasks necessary to construct a client/server system with a given architecture and the implementation-specific features of the system, such as its size, criticality to the company, required fault tolerance, and company resources. By carefully defining the task groups associated with construction of a given client/server system architecture, accurate baseline efforts may be attributed to each task group. The system and method of the present invention then customize these task groups to reflect the implementation details of a specific project, such as the company's development environment, resources, and planned uses of the system.

The task groups employed in the present invention may be determined in a number of different ways. For example, task groups necessary to construct a client/server system having a specified architecture may be determined from discussions with system integrators who have installed such client/server systems. The scope of this undertaking is made manageable by hierarchical nature of the planning process. For example, task groups are typically generated for major components of the client server system for each phase of the installation (defining, planning, prototyping, implementing). The tasks that make up each task group are then more easily defined and the effort involved for each task can be more accurately estimated.

In the preferred embodiment of the present invention, the task groups are determined using a knowledge base advisor system, described in co-pending U.S. patent application Ser. No. 08/609,398, incorporated by reference herein. This system uses a rule based expert system to determine a client/server architecture suitable for a user, based upon the user's responses to questions provided by an advisor interface. In conjunction with architecture selection process, the system also selects task groups necessary to construct a client/server system having the identified architecture from a super set of task groups that is stored in the knowledge base of the expert system. Task groups relevant for construction of a client/server architecture are selected from a superset of task groups in conjunction with an architecture selection advisor and a task advisor. Appendix B includes the superset of tasks and component sub-tasks from which task groups for a specific client server architecture project are selected.

Provided the component tasks of a task group are well-defined, the baseline efforts for each task group may be readily determined for a specified set of conditions, including skill levels, resources, fault tolerance, and the like. Each of these factors will vary from the specified level depending on different, quantifiable aspects of the implementation. The present invention identifies these factors and their complex interactions using a rule based expert system.

Referring first to FIG. 1, there is shown a block diagram of a project estimator 100 in accordance with the present invention. Project estimator 100 is organized as an advisor interface 110, an inference engine 130, and an advisor module 102 comprising, a ruled based expert system 150, a rule-indirection interface 160, a neural network 180, and a summer 190. Expert system 150 further comprises a question table 132 and a plurality of rule groups 140. Responses to questions are stored in an area of working memory (not shown) associated with question table 132 and accessible to inference engine 130. Neural network 180 comprises a plurality of task group neurodes 170, each of which corresponds to a set of well-defined tasks (not shown).

Figure 2:
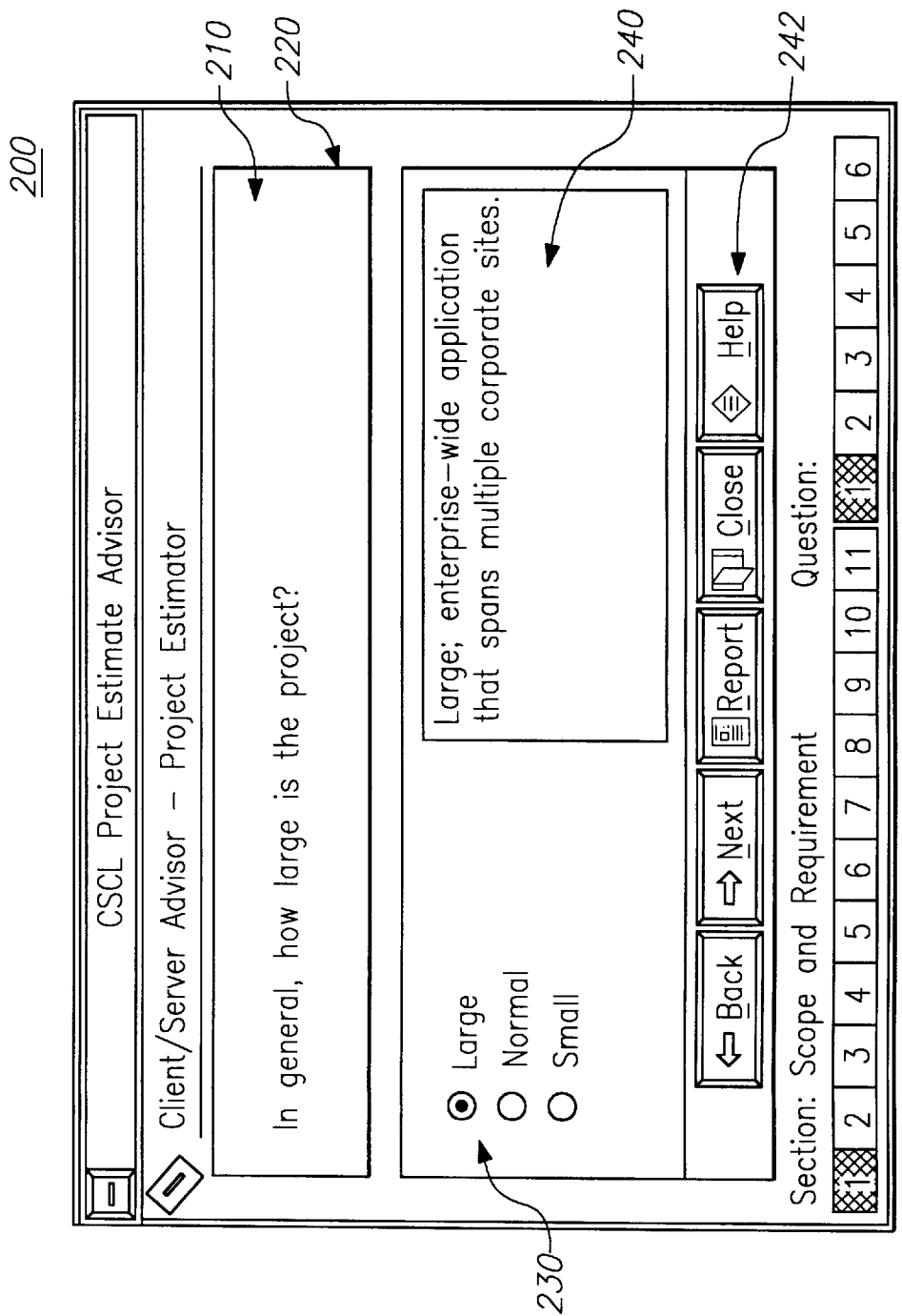
FIG. 2 is a display of advisor interface module from the system of FIG. 1.

Advisor module 102 couples questions from question table 132 to advisor interface 110, displays them to a user as shown in FIG. 2, and stores the user's responses in working memory accessible to inference engine 130. In one embodiment of the invention, a question rulebase 134 is used by advisor module 102 to display to the user, through the advisor interface 110, questions selected on the basis of the users previous responses. A more detailed discussion of such "intelligent questioning" is provided in the Knowledge Base Advisor application, incorporated by reference herein.

Advisor interface 110, advisor module 102, and inference engine 130 are implemented on any of a number of currently available processor platforms. In a preferred embodiment of the present invention, advisor interface 110, advisor module 102, and inference engine 130 are implemented on a platform having processing power at least equivalent to that of an Intel processor (386 or higher) running the Windows operating system (3.1 or higher).

Referring now to FIG. 2, there is shown a screen 200 produced by advisor module 102 at interface 110. The user is presented with a question 210 in window 220 and possible responses 230 appear below window 210 on the left side of screen 200. As each possible response 230 is highlighted, an explanation 240 of its significance is shown on the light of screen 200, allowing the user to choose a well-informed response. Icons 242 along the bottom of the screen allow the user to view earlier or later questions, request help, or trigger the inference engine 130 to begin processing the answers.

Table 1 includes a sample of questions 210 presented to the user by advisor interface 110, possible responses 230 and explanations 240 of how each response will be interpreted by project 100. Note that the questions estimator 210 relate to quantifiable features of a client/server system such as its size, required level of fault tolerance, required performance level, and module sources. These features, which vary for each implementation of a given client/server architecture, must be considered in order to accurately estimate the effort necessary to complete the client/server installation.

TABLE 1

| QUESTION | RESPONSES (Explanation) |
| --- | --- |
| In general, how large is the project? | Large (enterprise-wide application, spans multiple corporate sites.) |
| | Normal (corporate-wide application used by multiple departments.) |
| | Small (workgroup/departmental application used by a small number of people.) |
| Is the application going to replace a mission-critical or line-of-business process? | Yes |
| | No |
| | Partially (The system will have an impact on or replace some functionality of an existing mission-critical application.) |
| What are your application's fault-tolerance requirements? | Highest availability (The system must always be on line.) |
| | High availability (Only a few hours of down time per year) |
| | Normal availability (If the system fails, it must be brought back up with the current day's data within a predefined period of time.) |

TABLE 1-continued

| QUESTION | RESPONSES (Explanation) |
| --- | --- |
| What are your application's performance requirements? | High (Response must be immediate, no matter how many concurrent users are logged in.)<br>Normal (System response must be within acceptable normal limits most of the time.) |
| What are your application's security requirements? | Maximum (Security is paramount. Information protected via data encryption.)<br>High (Security is critical. Sensitive information must be protected via login, network and database security.)<br>Normal (Security is important but not critical. login provides generalized access to the entire system.)<br>Unsecured (The system does not need security.) |
| What are your system management requirements? | Single image (The entire system must be able to be managed as if it is a single computer. If necessary, performance can be traded for ease of management.)<br>High (The system can be managed easily and autonomously even for remote locations. However, performance consideration should come before ease of management.)<br>Normal (The system is manageable by a staff of trained administrators.) |
| What percentage of the GUI modules will be drawn from either an object repository or from an existing application? | 75–100% (All development in-house uses extensive object-oriented development methodologies and standardized reusable code components.)<br>50–75% (There is an extensive repository of reusable code components in-house that is utilized by the majority of the development staff.)<br>25–50% (There is an existing repository of reusable code components that are utilized by various developers.)<br>Less than 25% (Some development teams have created their own code repositories, but standardized coding procedures and reusability standards are not employed in the organization.) |
| What percentage of the complex business processing modules will be drawn from either an object repository or from an existing application? | 75–100%<br>50–75%<br>25–50%<br>Less than 25% |
| What percentage of the database transaction modules will be drawn from either an object repository or from an existing application? | 75–100%<br>50–75%<br>25–50%<br>Less than 25% |
| What percentage of the new database schema can be derived from an existing database? | 75–100% (The new application's database schema will be derived primarily from an existing database system.<br>50–75% (A large portion of the new application's database schema can be derived from an existing database system.)<br>25–50% (Some of the new application's database schema can be derived from an existing database system but the majority will have to be created for this application.)<br>Less than 25% (Most of the new application's database schema will be created with the development of this system.) |
| How stable are the critical software components such as the operating system, communications, and database servers? | Extremely stable (All components of the system have been thoroughly tested and successfully implemented in a number of production environments.)<br>Moderately stable (Most components of the system have been tested and similar systems have been successfully implemented in the past.)<br>Unstable (Little or no components of the system have been tested and/or the system will be implemented in a new or untried technology.) |
| How stable is the application development environment, including software tools and utilities? | Extremely stable (The application development tools and utilities have been used successfully on numerous projects.)<br>Moderately stable (The application development tools have been used on a number of projects. The development staff is comfortable with the existing tools and proficient in their use.)<br>Unstable (The application development environment for this project will be using new or untried development tools.) |
| How stable is the hardware technology employed in the C/S architecture such as the server, network, and communication links? | Extremely stable (many applications using similar hardware have been developed and successfully deployed using the existing C/S architecture.)<br>Moderately stable (The proposed technology has been used successfully by other organizations, but is new to the developers of this system.)<br>Unstable (The proposed application will be using relatively new or untried hardware that none of the developers of the system have worked with before.) |

Once advisor interface 110 has asked all relevant questions of the user, inference engine 130 applies each rule group 140 to the responses accumulated in response memory working area 136 to generate an effort factor EF for each rule group 140. Rule groups 140 track the different questions asked by advisor interface 110, although there is not necessarily a one to one correspondence. For example, EFs for rule groups 140 relating to system criticality and GUI complexity are determined from decision tables (matrices) of user answers to selected questions. Examples of specific rule groups 140 and their corresponding EFs are discussed in greater detail below.

Figure 3:
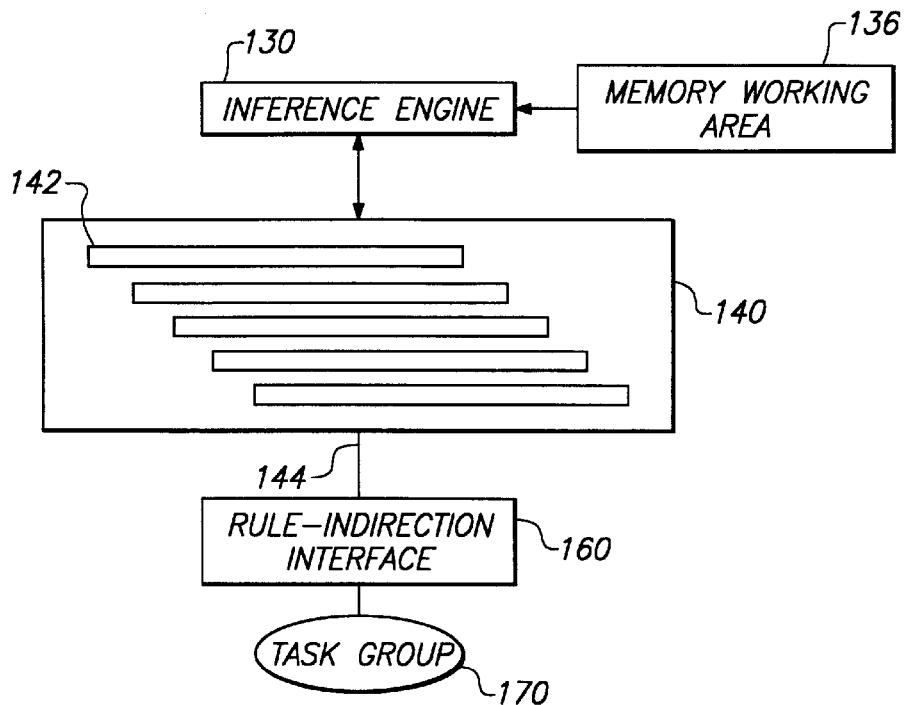
FIG. 3 is a more detailed block diagram showing the interaction between the advisor interface module and a rule group.

Referring now to FIG. 3, there is shown a block diagram of a rule group 140 and its interactions with inference engine 130 and rule-indirection interface 160. In general, rule group 140 comprises a plurality of related rules 142 that combine to produce the single output EF. For example, in the preferred embodiment a project size rule group 140 comprises three rules 142 that are selectively fired to select an EF value based on the users response to the project size question.

TABLE 2

```
[DefineBeginRuleGroup]
RuleGroupID = 10
RuleGroupName = "Project size factor"
Description = "Project size factor"
;
[DefineRule]
RuleName = "Project size - Large"
Priority = 100
Description = ""
IF
        [Project size] = "Large"
THEN
                [#Effort_level] = 3
;
[DefineRule]
RuleName = "Project size - Normal"
Priority = 100
Description = ""
IF
        [Project size] = "Normal"
THEN
                [#Effort_level] = 2
;
[DefineRule]
RuleName = "Project size - Small"
Priority = 100
Description = ""
IF
        [Project size] = "Small"
THEN
                [#Effort_level] = 1
[DefineEndRuleGroup]
```

The structure and operation of a "project size" rule group 140 are indicated by Table 2. "Project size" is a simple, single parameter rule group 140 that generates one of three EF values as its output, depending on whether the user characterizes the project as large (enterprise wide application spanning multiple corporate sites), normal (corporate wide, multiple departments), or small (single department system used by a small number of people).

Referring now to Table 3, there is shown the definition of "system criticality" rule group 140. As noted above, in the preferred embodiment of the invention the "system criticality" EF is generated by a matrix function (decision table) of user responses to various other questions displayed by advisor interface 110.

TABLE 3

```
[DefineBeginRuleGroup]
RuleGroupID = 20
RuleGroupName = "System criticality factor"
Description = "System criticality factor"
;
•
[DefineRule]
RuleName = "System criticality"
Priority = 100
Description = ""
THEN
        [#Effort_level] = "@matrix('System
criticality', 'Mission critical application', 'Fault
tolerance', 'Performance', 'Security', 'System management')"
[DefineEndRuleGroup]
```

The EF generated by "system criticality factor" rule group 140 is determined from a decision table based on the user's answers to five other questions, labeled "mission critical application", "fault tolerance", "performance", "security", and "system management". The decision table, indicated by the operator, @matrix, is shown in Table 4.

TABLE 4

```
[DefineMatrix]
MatrixID = 10
MatrixName = "System criticality"
MatrixCol = 5
Description = "System criticality"
Default = 1
#"Mission critical application", "Fault
tolerance", "Performance", "Security", "System management"
Data = 3    'Yes', '*', '*', '*', '*'
Data = 3    'Partially', '*', '*', maximum, single image
Data = 3    "'Partially', '*', High, '*', Single image
Data = 3    "'Partially', '*', High, Maximum, '*'"
Data = 3    "'Partially', 'Highest availability', '*', '*', Single image
Data = 3    "'Partially', 'Highest availability', '*', maximum, '*'
Data = 3    "'Partially', 'Highest availability', High, '*', '*'
Data = 3    "'No', '*', High, Maximum, Single image
Data = 3    "'No', 'Highest availability', '*', Maximum, Single image
Data = 3    "'No', 'Highest availability', High, '*', Single image
Data = 3    "'No', 'Highest availability', High, Maximum, '*'
Data = 2    "'No', '*', '*', Maximum, Single image
Data = 2    "'No', '*', High, '*', Single image
Data = 2    "'No', '*', High, Maximum, '*',
Data = 2    "'No', 'Highest availability', '*', '*', Single image
Data = 2    "'No', 'Highest availability', '*', Maximum, '*'
Data = 2    "'No', 'Highest availability', High, '*', '*'
```

In Table 4, an entry '*' indicates that the effort level is independent of the answer to the associated question.

Table 5 and 6 indicate the definition and decision table, respectively, for "GUI Complexity" rule group 140.

TABLE 5

```
[DefineBeginRuleGroup]
RuleGroupID = 30
RuleGroupName = "GUI complexity factor"
;
[DefineRule]
RuleName = "GUI complexity"
Priority = 100
Description = "GUI complexity"
THEN
        [#Effort_level] = "@matrix('GUI complexity', 'GUI
Reuse', 'Primary GUI dialogues')"
;
[DefineEndRuleGroup]
```

TABLE 6

```
[DefineMatrix]
MatrixID = 20
MatrixName = "GUI complexity"
MatrixCol = 2
Description = "GUI complexity"
Default = 1
#"GUI Reuse", "Primary GUI
dialogues"
Data = 4        "Less than 25%', 'More than 50'"
Data = 3        "'Less than 25%', '25 to 50'"
Data = 2        "'Less than 25%', '10 to 25'"
Data = 1        "Less than 25%', 'Less than 10'"
Data = 3        "'25–50%', 'More than 50'"
Data = 2        "'25–50%', '25 to 50'"
Data = 1        "'25–50%', '10 to 25'"
Data = 1        "'25–50%', 'Less than 10'"
Data = 2        "'50–75%', 'More than 50'"
Data = 1        "'50–75%', '25 to 50'"
Data = 1        "'50–75%', '10 to 25'"
Data = 1        "'50–75%', 'Less than 10'"
Data = 1        "'75–100%', '*'"
```

In the preferred embodiment, project estimator 100 comprises additional rule groups 140 relating to System Management, Security, Performance, Fault Tolerance, Mission Critical Application rule groups. Each of these quantify different, implementation-dependent properties of the client/server system through a corresponding output EF. A summary of these rule groups 140 and the rules implemented for determining their corresponding effort factors is attached to this application as Appendix A.

EF serves as one component of a weighting factor that will be coupled to one or more task group neurodes 170 according to its relevance to the specific tasks represented by the neurode. For example, the user's responses to questions about the project displayed by advisor interface 110 may indicate that the project has an unusually low fault tolerance. This fact will be reflected in a correspondingly large EF when inference engine 130 applies fault tolerance rule group 140 to facts accumulated in memory working area 136. Consequently, any of task group neurodes 170 that relate to the stability of the client/server system against faults will require greater effort to complete and, consequently, will be strongly coupled to "fault tolerance" rule group 140.

Generally, the net impact of a property represented by a rule group 140 on one of task group neurodes 170 depends on both the EF of the rule group and the influence factor that reflects the correlation between task group 170 and the property at issue. This influence factor (IF) is implemented by rule-indirection interface 160 and operates on EF as a multiplicative factor. In the preferred embodiment of the invention, IF ranges between zero (no correlation between rule group 140 and task group neurode 170) and one (full correlation between rule group 140 and task group neurode 170).

Referring again to FIG. 3, the role of rule indirection interface 160 is indicated by the change in thickness of connecting line 144 as it passes from rule group 140 to task group neurode 170. In the disclosed example, the thickness of connecting line 144 above rule-indirection interface 160 indicates the relative size of EF for rule group 140, with thicker lines 144 indicating larger EFs. Reduction in EF by rule-indirection interface 160, i.e. IF <1, indicates less than complete correlation between the plurality of tasks represented by task group neurode 170 and the system property represented by rule group 140.

For example, if task group neurode 170 represents a set of tasks relating to the GUI prototyping and rule group 140 relates to fault tolerance of a communication link, the correlation between fault tolerance rule group 140 and GUI prototyping task group 170 will be low (IF<<1). The need for low fault tolerance will not have much impact on the tasks involved in prototyping the GUI. On the other hand, if task group neurode 170 represents a set of tasks relating to reliability of the client server system, rule-indirection interface 160 would likely maintain a strong correlation between rule group 140 and task group neurode 170, i.e. IF≈1.

Figure 4:
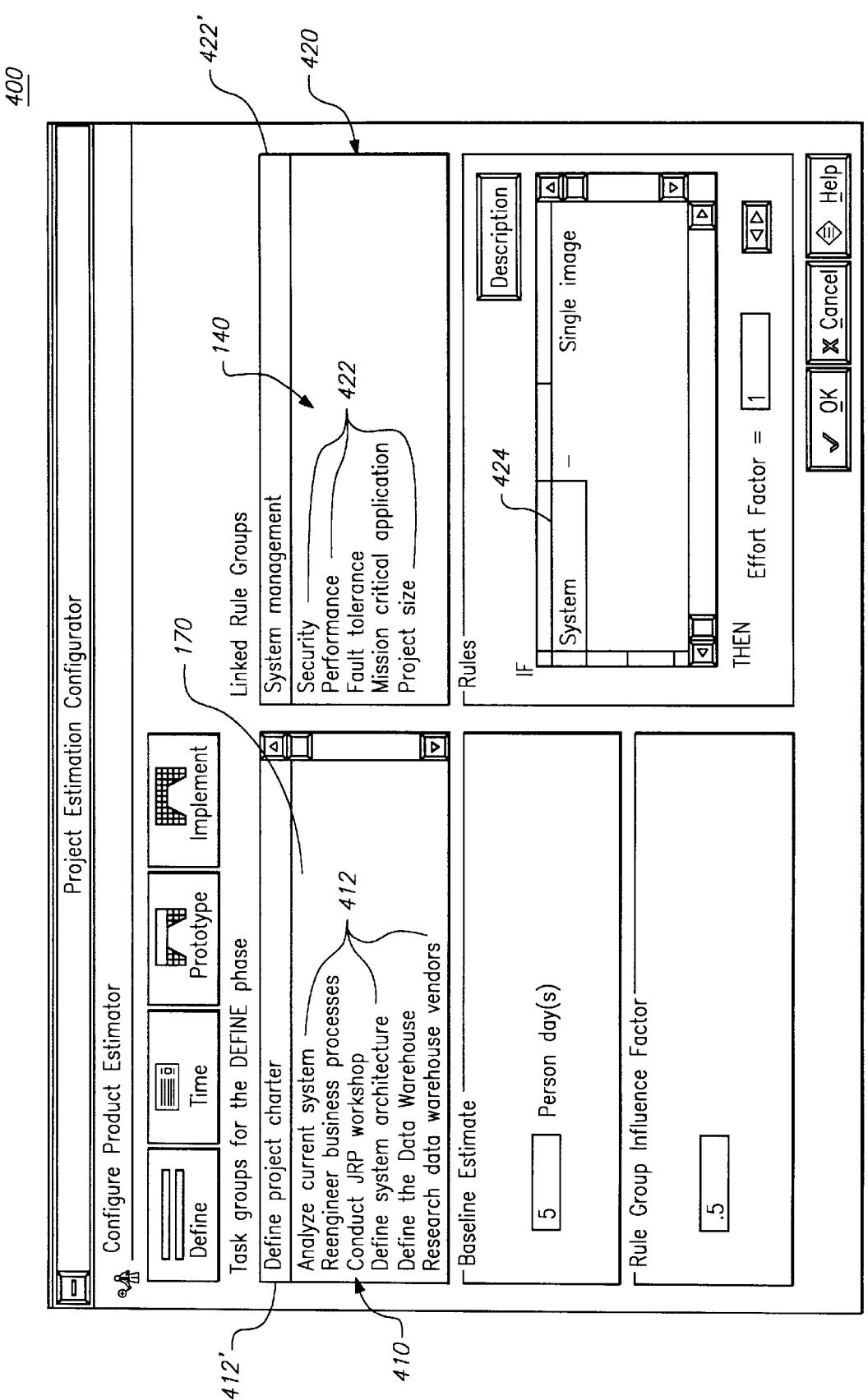
FIG. 4 is a view of a configuration (rule indirection) module, showing the coupling between task group neurodes and rule groups.

Referring now to FIG. 4, there is shown a screen 400 representing the interplay between rule-indirection interface 160, task group neurodes 170 and rule groups 140. Window 410 displays task groups 170 that are used in the "DEFINE phase" of the client/server project. Labels 412 in window 410 represent one of task groups 170 necessary to define the project charter, analyze the current system, reengineer the business processes, and the like.

Window 420 on the right side of screen 400 indicates labels 422 of rule groups 140 linked to the highlighted task group neurode 170 (Define project charter). Linked rule groups 140 are those having non-zero IFs for "define project charter" task group neurode 170. A label 424 below window 420 indicates a component rule 142 of rule group 140, and below that is the EF (=1) determined from the user's responses by all component rules 142 of rule group 140. To the left of EF in screen 400 there is also indicated an IF of 0.5, representing an intermediate correlation between "system management" 422 and "define project charter" 412' It is not surprising that there is some correlation here, since system management will have to be described in the project charter. Screen 400 displays similar correlations for each task group neurode 170 and each rule group 140 relevant to the client server system.

Referring again to FIG. 1, the last element of neural estimator 100 is summer 190, which collects the outputs from each of task group neurodes 170 to produce an estimate of the project effort (PE) at its output. Mathematically, this can be represented as follows:

$$PE = \Sigma\Sigma B_i (EF_j \cdot IF_{ij})$$

Here, $B_i$ is the baseline effort value for neurode 170($i$), $EF_j$ is the effort factor for rule group 140($j$), and $IF_{ij}$ is the influence factor coupling rule group 140($j$) to task group 170($i$). One summation is over all rule groups 140 correlated with a task group neurode 170 and the other summation is over all task group neurodes 170.

Figure 5:
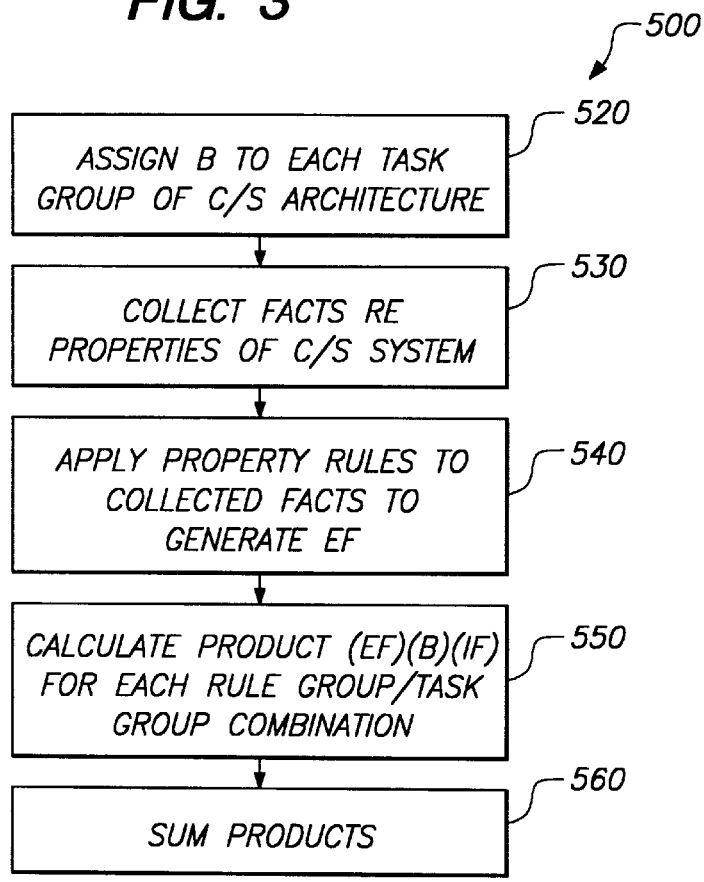
FIG. 5 is a flow chart of a method for estimating the effort required to complete a project in accordance with the present invention.

Referring now to FIG. 5, there is shown a flow chart of a method 500 for estimating the effort necessary to implement a client/server project in accordance with the present invention. Method 500 begins by assigning 520 a baseline effort value to each task group specified by the client/server architecture. Facts about the system requirements such as fault tolerance, security, performance, and capacity (size) are then collected 530 from a project manager or some other knowledgeable source. Expert-based rules 140 are then applied 540 to the collected facts to determine an effort factor (EF) for each rule group 140. For each rule group 140 and task group 170, a product of the corresponding effort factor and baseline effort value is scaled 550 according to an influence factor (IF) determined by the correlation between the rule group 140 and task group 170. The scaled products are then summed 560 to provide an estimate of the project effort (PE) required to complete the client/server project.

The present invention is made more powerful by the fact that it can be improved with use by allowing IF values generated by rule indirection module 160 to be modified according to difference between actual and estimated project efforts. For example, once a project has been completed, the actual project effort necessary to complete a task group 170 of the project can be compared with the project effort calculated for the task group by system 100. This project effort (PE) is given by $\Sigma$ ($B_i \cdot EF_j \cdot IF_{ij}$), where the summation is over the j rule groups 140. Assuming that any difference between the actual and calculated (PE) value is attributable to rule-indirection module 160, the $IF_{ij}$ values can be adjusted to improve agreement between the actual and calculated (PE) values.

Any of a number of well known algorithms may be used for training project estimator 100. One such method is "Minimum Error Learning Algorithm", as disclosed in Caudill & Butler, Understanding Neural Networks, Vol. 1, MIT Press.

Figure 6:
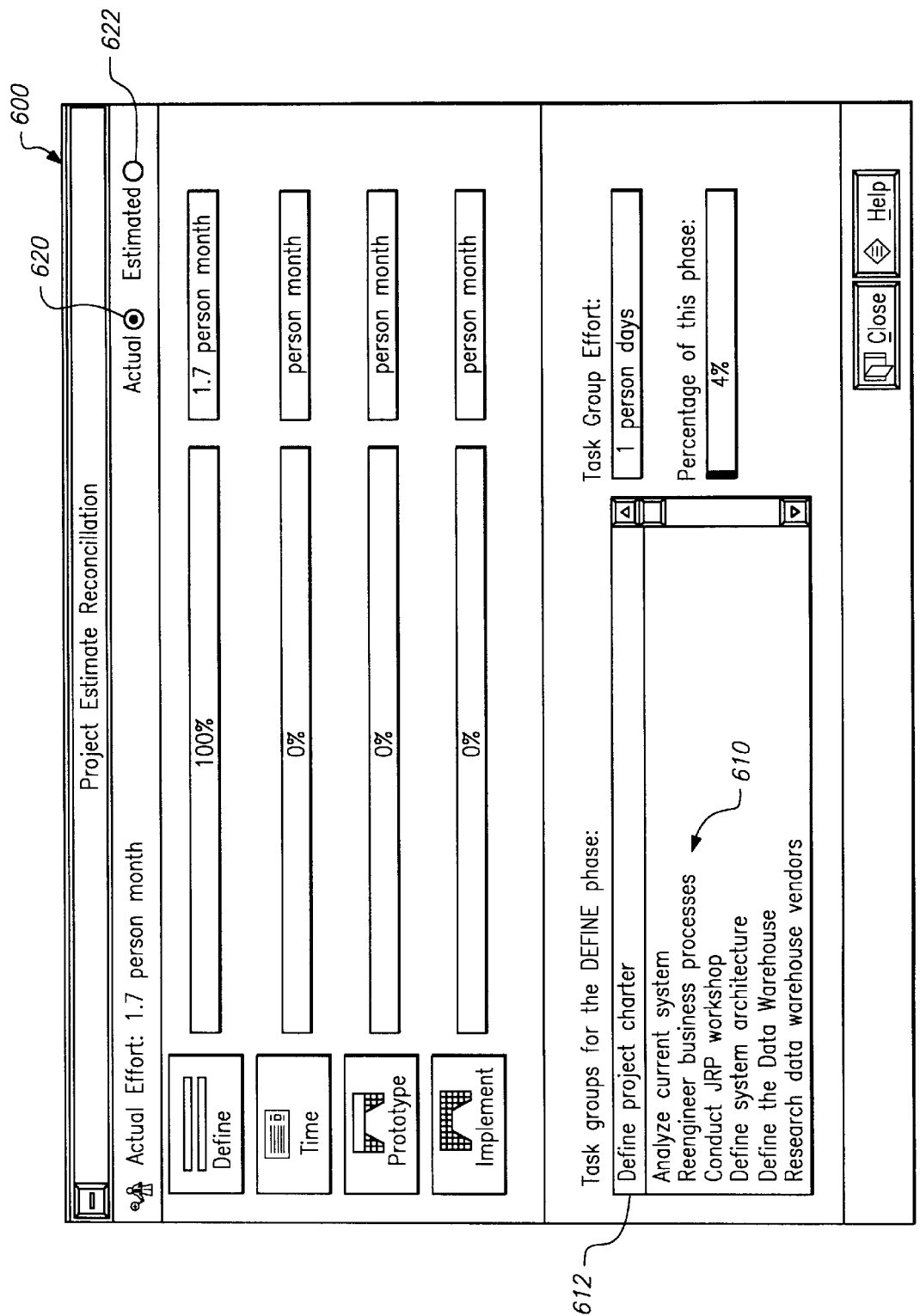
FIG. 6 is a view of a reconciliation module, for training the neural network of the system of FIG. 1.

Referring now to FIG. 6, there is shown a screen 600 in accordance with the preferred embodiment of the present invention for monitoring the accuracy of project estimator 100. Screen 600 allows a user to see the actual effort expended on a project, which in FIG. 6 corresponds to all task groups that make up the "DEFINE phase" of the project. As indicated, these task groups required 1.7 person months of effort to complete. Highlighting different labels

610 displays either the actual effort required or the effort estimated by project estimator 100, depending on whether actual 620 or estimated 622 values are selected (upper right corner of screen 600). Actual efforts are entered into project estimator 100 by the user through a different interface. Using the algorithm identified above, actual values may be used to adjust IF values so that over time the performance of project estimator 100 improves.

It is understood that the embodiments discussed above are intended to be representative of the present invention, and persons skilled in the art will, based on this disclosure, be able to develop other systems and variations on systems that fall within the spirit of this invention. Accordingly, the present invention should be limited only by the following claims.

Appendix A

| RULE GROUP | RULE |
|---|---|
| Project size factor | IF [project size] = "Large"<br>THEN [#Effort level] = 3<br><br>IF [project size] = "Normal"<br>THEN [#Effort level] = 2<br><br>IF [project size] = "Small"<br>THEN [#Effort level] = 1 |
| System criticality factor | [#Effort_level] = @ matrix (system criticality, mission critical application, fault tolerance, performance, security, system management) |
| GUI complexity factor | [#Effort_level] = @ matrix (GUI complexity, GUI reuse, Primary GUI dialogues) |
| Application complexity factor | IF [business process reuse] = "25-50%"<br>   [complex business modules] = "more than 50"<br>THEN [complex business modules] = "25-50"<br><br>IF [business process reuse] = "25-50%"<br>   [complex business modules] = "25-50"<br>THEN [complex business modules] = "10-25"<br><br>IF [business process reuse] = "25-50%"<br>   [complex business modules] = "10-25"<br>THEN [complex business modules] = "less than 10"<br><br>IF [business process reuse] = "50-75%"<br>   [complex business modules] = "more than 50"<br>THEN [complex business modules] = "10-25"<br><br>IF [business process reuse] = "50-75%"<br>   [complex business modules] = "25-50"<br>THEN [complex business modules] = "less than 10"<br><br>IF [business process reuse] = "50-75%"<br>   [complex business modules] = "more than 50"<br>THEN [complex business modules] = "less than 10"<br><br>[#Effort level} = " @matrix ('Application complexity','Application process','complex business modules','external data feed','distributed processes) |
| Database transaction complexity factor | [#Effort_level] = @matrix (database transaction complexity, database transaction reuse, complex database transactions) |

| | |
|---|---|
| Database complexity factor | IF     [Database schema reuse] IN "25-50%, 50-75%"<br>        [Database stables]     = "more than 500"<br>THEN [Database tables]      = "100-500"<br><br>IF     [Database schema reuse] IN "25-50%, 50-75%"<br>        [Database stables]     = "100-500"<br>THEN [Database tables]      = "100-500"<br><br>IF     [Database schema reuse]  = "75 - 100%"<br>        [Database stables]      IN "more than 500, 100-500"<br>THEN [Database tables]      = "less than 100"<br><br>[#Effort_level] = @matrix (database complexity, data relationship, database tables, distributed database) |
| Legacy system complexity factor | [#Effort_level] = @ matrix (Legacy system complexity, obscure legacy system, legacy data elements) |
| Development environment stability factor | [#Effort_level] = @ matrix (Development environment stability, Development environment stability, Software stability, Hardware stability) |
| Development tool factor | IF     [Development tool] = "Third generation language"<br>THEN [#Effor_level]     = "3"<br><br>IF     [Development tool] = "GUI builder"<br>THEN [#Effor_level]     = "2"<br><br>IF     [Development tool] = "Fourth generation language"<br>THEN [#Effor_level]     = "2"<br><br>IF     [Development tool] = "CASE/Application generator"<br>THEN [#Effor_level]     = "1" |
| Production environment stability factor | [Hardware/Software stability] = @ matrix (Hardware/Software stability, Hardware stability, Software stability)<br><br>[Network/Hardware expansion] = @ matrix (Network/Hardware expansion, Network expansion, Hardware expansion)<br><br>[#Effort_level] = @ matrix (Production environment stability, Hardware/Software stability, Network/Hardware expansion) |
| Management skill factor | IF     [Management experience] = "Inexperienced"<br>THEN [#Effor_level]     = "3"<br><br>IF     [Management experience] = "Moderately experienced"<br>THEN [#Effor_level]     = "2"<br><br>IF     [Management experience] = "Highly experienced"<br>THEN [#Effor_level]     = "1" |
| Project team prior experience factor | [#Effort_level] = @ matrix (Project team prior experience, Working together, Project team experience, Development environment familiarity) |

| Project team skill factor | [#Effort_level] = @ matrix (Project team skill factor, Project team skill, Development tool experience) |
|---|---|
| Documentation expertise factor | IF [Documentation expertise] = "High"<br>THEN [#Effor_level] = "1"<br><br>IF [Documentation expertise] = "Moderate"<br>THEN [#Effor_level] = "2"<br><br>IF [Documentation expertise] = "Low"<br>THEN [#Effor_level] = "3" |
| Coding Experience Factor | IF [Coding expertise] = "High"<br>THEN [#Effor_level] = "1"<br><br>IF [Coding expertise] = "Moderate"<br>THEN [#Effor_level] = "2"<br><br>IF [Coding expertise] = "Low"<br>THEN [#Effor_level] = "3" |
| Modeling experience factor | IF [Modeling expertise] = "High"<br>THEN [#Effor_level] = "1"<br><br>IF [Modeling expertise] = "Moderate"<br>THEN [#Effor_level] = "2"<br><br>IF [Modeling expertise] = "Low"<br>THEN [#Effor_level] = "3" |
| Staffing factor | IF [Full time staff] = "Less than 15"<br>THEN [#Effor_level] = "4"<br><br>IF [Full time staff] = "15-49"<br>THEN [#Effor_level] = "3"<br><br>IF [Full time staff] = "50-100"<br>THEN [#Effor_level] = "2"<br><br>IF [Full time staff] = "Over 100"<br>THEN [#Effor_level] = "1" |
| User participation factor | IF [User participation] = "No participation"<br>THEN [#Effor_level] = "3"<br><br>IF [User participation] = "Moderate"<br>THEN [#Effor_level] = "2"<br><br>IF [User participation] = "Significant"<br>THEN [#Effor_level] = "1" |

| | |
|---|---|
| User requirement volatility factor | IF [User requirement changes] = "Significant"<br>THEN [#Effor_level] = "3"<br><br>IF [User requirement changes] = "Moderate"<br>THEN [#Effor_level] = "2"<br><br>IF [User requirement changes] = "Minor"<br>THEN [#Effor_level] = "1" |
| Centralized design approval factor | IF [Centralized design approval] = "yes"<br>THEN [#Effor_level] = "2"<br><br>IF [Centralized design approval] = "No"<br>THEN [#Effor_level] = "1" |
| Prototype/full implementation factor | IF [Implementation] = "Full implementation"<br>THEN [#Effor_level] = "3"<br><br>IF [Implementation] = "Incremental implementation"<br>THEN [#Effor_level] = "2"<br><br>IF [Implementation] = "Prototype"<br>THEN [#Effor_level] = "1" |
| Prototyping approach factor | IF [Prototype application] = "No"<br>THEN [#Effor_level] = "2"<br><br>IF [Prototype application] = "Yes"<br>THEN [#Effor_level] = "1" |
| Corporate politics factor | IF [Political delay] = "High"<br>THEN [#Effor_level] = "3"<br><br>IF [Political delay] = "Moderate"<br>THEN [#Effor_level] = "2"<br><br>IF [Political delay] = "Low"<br>THEN [#Effor_level] = "1" |

*Appendix B*

Define project charter
    Define high level functional objectives
    Define high level management objectives
    Identify champion users
    Conduct initial feasibility study
    Conduct initial risk analysis
    Conduct initial cost/benefit analysis
    Create a project charter document
    Obtain upper management and user buy-in and commitment
    Deliverable: Project Charter document
Analyze current system
    Review documentation on current system
    Review current system's architecture
    Identify current users and their tasks
    Gather user feedback on the current system
    Identify current system's developers
    Gather developers' feedback on the current system
    Identify current system's administrators
    Gather the system administrators' feedback on the current system
    Identify shortcomings of current system
    Create a current system analysis document
    Deliverable: Current System Analysis document
Reengineer business processes
    Identify the reengineering team
    Select a business process reengineering tool
    Conduct reengineering workshops
        Define critical business success factors
        Model existing business processes
        Reengineer business processes
        Identify key enabling technology
        Revise feasibility study
        Revise risk analysis
        Revise cost/benefit analysis
    Write first-draft reengineering document
    Distribute reengineering document for review
    Obtain reengineer sign-off
    Deliverable: Reengineered Business Process Design document
Conduct JRP workshop
    Identify JRP team members
    Select a JRP leader
    Schedule JRP workshops
    Prepare JRP agenda and presentation material
    Distribute JRP agenda and presentation material
    Distribute project documents to JRP members
    Conduct JRP workshops
        Define major system functionalities
        Prioritize system functionalities
        Identify interfaces to external systems
        Identify users and roles of the system
        Identify user interface requirements
        Identify user task requirements
        Identify performance requirements
        Identify fault tolerance requirements
        Review corporate security standards
        Identify security requirements
        Identify system management requirements
        Identify batch processing requirements
        Identify storage requirements
        Identify on-line help requirements
        Identify help-desk requirements
        Identify end-user training requirements
        Identify corporate wide policy and standards
        Resolve all open issues
    Consolidate workshop results, create a project requirement document
    Distribute the requirement document for review
    Revise requirement document
    Obtain requirement document sign-off
    Obtain project requirements sign-off
    Deliverable: Project Requirement Specification document
Define system architecture
    Identify potential system architectures Analyze potential system architectures
Determine application partitioning
    Define presentation service layer
    Define presentation logic layer
    Define business rule layer
    Define database request layer
    Define database service layer
Determine data replication strategy
Define production hardware and software environment
Select a system architecture
Review and modify project tasks
Deliverable: System Architecture Definition document
Define the Data Warehouse
    Identify need for data warehouse
    Evaluate the industry's standard data warehouse types
    Select data warehouse client/server architecture
    Deliverable: Data Warehouse Requirements Document
Research data warehouse vendors
    Create a list of data warehouse providers
        Research data warehouse software alternatives
        Research data warehouse hardware alternatives
        Select "physical" or "virtual" data warehouse
    Contact the data warehousing vendors
    Review marketing materials and seek additional information
    Select vendors to receive RFI
    Deliverable: RFI Document
Research package vendors
    Create a list of package providers
    Contact the vendors
    Review marketing materials and seek additional information
    Select vendors to receive RFI
    Deliverable: RFI Document
    Deliverable: Package Vendor Research Document
Select vendor package
    Read and analyze responses to RFI
    Invite vendors for in-house demos
    Review vendor demos
    Perform hands-on evaluation
        Compare project specification to vendor feature list
        Evaluate architectural constraints of package
        Evaluate database constraints of package
        Evaluate interprocess constraints of package
        Grade the usability of the GUI
        Grade the package's stability
    Perform final analysis of vendor's viability
    Select a package
    Deliverable: Package Evaluation & Selection Report
Define the integrated package
    Define the package application areas
    Define the package environment
        Define the package hardware environment
        Define the package software environment
        Define the package database environment
        Look for hidden incompatibilities
    Define the package system architecture
    Define the package integration points
    Define the package tool suite
    Define the package system management interfaces
    Deliverable: Package Integration Definition Document
Review project definition process
    Conduct definition process review session
    Refine the project definition process
    Deliverable: Process Review document
Customize the CS/8000 project plan
    Confirm project tasks and deliverables
    Define timeboxes if needed
    Define project iterations
        Review prioritized system functions
        Assign highest priority tasks to the initial iterations
    Define project partitions
    Define project teams Customize project tasks
Plan the project resources
    Identify resource requirements
    Assess resource skills and training requirements
    Identify the need for outside consultants
    Hire outside consultants if needed
    Schedule required resource training
    Assign resources to teams
    Assign resources/teams to tasks
Assemble the final project plan
    Develop quality plan
    Develop estimates and schedule
    Create a project plan prototype
    Distribute project plan for review
    Consolidate feedback and revise project plan
    Obtain project plan sign-off
    Deliverable: Project Plan document
Establish project control
    Establish project status reporting procedures
    Establish issues tracking and resolution methods and tools
    Establish cost and schedule tracking methods
    Establish performance and quality classifications
    Deliverable: Project Control Plan and Procedures document
Create a Request For Proposal, if desired
    Determine the precise requirements which will be addressed in the RFP
    Evaluate the benefits associated with the RFP
    Evaluate the risks associated with the RFP
    Deliverable: Request for Proposal document
Implement CASE/Repository
    Confirm the commitment to a CASE/Repository approach
    Evaluate and select a CASE/Repository
    Procure the CASE/Repository
    Procure the additional necessary hardware and software
    Establish training schedule and objectives
    Install the CASE/Repository
    Train staff on the CASE/Repository
    Designate a staff as the CASE/Repository manager
    Customize the CASE/Repository
    Establish procedures and guidelines for using the CASE/Repository
    Deliverable: Installed CASE/Repository environment and CASE/Repository document
Implement JAD workshops
    Select JAD design and documentation tools
    Identify JAD team members
    Select a JAD leader
    Schedule JAD workshops
    Prepare JAD agenda and presentation material
    Distribute JAD agenda and presentation material
    Distribute project documents to JAD members
    Conduct JAD workshop
    Conduct system modeling
    Identify corporate business rules
    Resolve all open issues
    Consolidate workshop results and create a JAD design document
    Distribute the JAD document for review
    Revise JAD design document
    Obtain JAD design sign-off
    Deliverable: Project Design document
Model system context
    Define the interaction between the system and organizational units
    Define the interaction between the new system and existing system
    Define the major data flows in and out of the system
    Deliverable: System Context Model and System Context Model document
Model user tasks, events, and workflow
    Understand who the primary users of the system are
    Classify users into functional roles
    For each role, identify user tasks and the frequency of each task
    For each role, identify events that triggers the tasks
    Analyze task dependencies and interactions
    Identify inputs and outputs for each task
    Analyze the flow of work and data among users
    Deliverable: User Task Analysis document Model user interface
    Select a tool for modeling user interface
    Understand user roles and tasks associated with each role
    For each set of related tasks, define one or more user screens
    Define the screen flow based on task flow analysis
    Define the events and processing for each screen
    For each screen, build a "look and feel" model
    Link the screen models to create a minimal prototype
    Obtain reporting requirements from users
    Create report models
    Conduct review session with users
    Refine screen and report designs
    Obtain user signoff
    Deliverable: Completed User Interface Model and User Interface Model document
Model objects
    Identify major classes and objects
    Structure classes and objects into hierarchies
    Identify relationships between classes and objects
    Identify attributes for classes and objects
    Identify object states and behavior
    Define object services (methods)
    Deliverable: Object Analysis Model and Object Analysis document
Model business events
    Identify major business events
    For each event, describe the process that need to happen
    Deliverable: Business Event Model and Business Event document
Model business processes
    Identify major business processes of the system
    Decompose each process into subprocesses
    Define the dependency and relationship among processes
    Identify data input/output for each process
    Deliverable: Data/Process Flow Model and Data/Process Flow document
Model business functions
    Identify major business functions of the system
    Decompose each function into subfunctions
    Deliverable: Function Decomposition Model and Function Decomposition document
Model the data
    Select a functional area to model
    For each area, identify major data elements
    Build a dictionary of data elements and their descriptions
    Group elements into entities
    For each entity, define a unique identifier (key)
    Estimate the data volume (cardinality) for each entity
    Analyze and model relationships among entities
    Add attributes to entities
    Normalize the data model
    Combine data models from all functional areas
    Deliverable: Data Model and Data Model document
Model the distributed system
    Identify geographic locations where the system will operate
    Analyze processes distribution for each location
    Analyze data distribution for each location
    Analyze function distribution for each location
    Analyze event distribution for each location
    Analyze object distribution for each location
    Update the system models with the distributed analysis
    Deliverable: Distributed System Model and Distributed System Model document
Model the Data Warehouse
    Identify operational data to be aggregated
    Design the data aggregation mechanism
    Design the summarization criteria
    Design the data access mechanism
    Deliverable: Data Warehouse Model Document
Model the integrated package
    Model the package application areas
    Model the package environment
        Model the package hardware environment
        Model the package software environment
        Model the package database environment
    Model the package system architecture
    Model the package integration points Model the package tool suite
Model the package system management interfaces
Deliverable: Package Integration Model Document
Refine system models
    Review all system models
    Iteratively refine the system models
    Deliverable: Refined System Models and Refined System Model document
Plan for system fault-tolerance
    Review system fault-tolerance requirements
    Analyze the planned system for potential failure points
    Discover and select vendor's high availability solutions
    Procure the required hardware and software solution
    Create a system fault-tolerance test plan
    Deliverable: System Fault-Tolerance Plan document
Plan the network
    Conduct network planning sessions
    Review existing network architecture
    Define/Review enterprise computing strategy and goal
    Analyze the performance requirements of the network
    Analyze the fault tolerance requirements of the network
    Analyze the security requirements of the network
    Analyze the system management requirements of the network
    Analyze the system integration requirements of the network
    Analyze the open system requirements of the network
    Design the network architecture
    Evaluate and prototype vendor solutions
    Create a network architecture implementation plan
    Prototype the network architecture
    Implement the network architecture
    Deliverable: Network Architecture document
Plan the database servers
    Analyze the performance requirements of the database server
    Analyze the fault tolerance requirements of the database server
    Analyze the security requirements of the database server
    Analyze the system management requirements of the database server
    Analyze the system integration requirements of the database server
    Analyze the open system requirements of the database server
    Analyze the data replication requirements of the database server
    Evaluate hardware vendor solutions
    Evaluate operating system vendor solutions
    Evaluate database software vendor solutions
    Conduct database server capacity planning
    Select a database server hardware platform
    Select a database server operating system platform
    Select database server software
    Procure the required hardware and software
    Install the hardware and software
    Deliverable: Installed database servers and Database Server document
Plan client workstation environment
    Define client hardware platform
    Define client OS platform
    Select client development tool(s)
    Procure the required hardware and software
    Install the hardware and software
    Deliverable: Installed client workstations and Client Workstation document
Plan development environment
    Analyze the requirement for physical development environment
    Analyze the existing physical environment
    Determine the hardware and software resources required for development
    Procure the required hardware and software
    Establish training schedule and objective
    Install hardware and software
    Train staff on the hardware and software
    Setup environment for source code control
    Designate a staff member as the source code librarian
    Establish source code backup procedure
    Deliverable: Installed development environment and Development Environment document
Plan database environment
    Designate a database administrator responsible to the project
    Define database standards
    Establish procedures for requesting database changes Establish procedures for reviewing and optimizing transactions
Establish procedures to manage multiple test database instances
Establish procedures for migrating database from development to test environment
Establish procedures for migrating database from test to production
Deliverable: Database Implementation and Migration Plan document
Plan the test environment
    Identify testing objectives
    Define procedures for problem tracking and resolution
    Determine the hardware and software resource required for testing
    Procure required hardware and software
    Establish training schedule and objective
    Install hardware and software
    Train staff on the hardware and software
    Setup environment and staff for configuration management
    Develop test plans for unit, usability, system integration, and security testing
    Deliverable: Installed test environment and Test Plan documents
Plan the production environment
    For multi-site system, select a site for the initial pilot system
    Determine strategy for phasing in the new system
    Determine the production hardware and software purchase plan
    Determine the production cutover strategy
    Establish system management strategy
    Establish performance monitoring procedures
    Establish end-user feedback procedures
    Determine help desk requirements
    Select help desk staff
    Train help desk staff
    Deliverable: Production Transition Plan document
Create application development standards and guidelines
    Plan for reusability
        Identify what new application objects will be reusable for future projects
        Identify what existing application objects, if any, can be reused for this project
    Define GUI standards
    Define GUI presentation model
    Establish GUI performance guidelines
    Establish database access performance guidelines
    Define coding standards
    Deliverable: Application Development Plan document
Plan data conversion
    Analyze the data conversion requirements
    Analyze the conversion data for integrity and volume
    Evaluate vendor-specific data conversion software
    Define the data conversion strategy
    Determine the method for running the data conversion in batch mode
    Deliverable: Data Conversion Plan document
Determine data analysis components
    Analyze the need for data analysis and mining
    Evaluate vendor-specific data analysis and mining tools
    Gather test data for the data analysis and mining tools
    Run test data against each data analysis and mining tools
    Select a data analysis and mining tool
    Deliverable: Data Analysis Plan document
Create system management plan
    Review system management requirement document
    Evaluate vendor-specific system monitoring and automation tools
    Select system monitoring and automation tools
    Deliverable: System Management Plan document
Review project planning process
    Conduct planning process review session
    Refine the project planning process
    Deliverable: Process Review document
Create GUI prototype
    Select GUI prototyping tool
    Design a GUI prototype
    Build a GUI prototype
    Conduct GUI prototype review session
    Obtain sign-off for the GUI prototype
    Deliverable: GUI prototype and GUI Prototype document
Develop performance prototype
    Identify areas of performance concern
    Determine performance prototyping method Build a performance prototype
Run the performance prototype
Tune the performance prototype
Re-run the performance prototype
Conduct performance prototype review session
Address critical performance issues
Update system design documents
Deliverable: Performance prototype and Performance Prototype document
Create feasibility prototype
    Identify areas of new/untested technology
    Build a feasibility prototype
    Run the feasibility prototype under stress
    Conduct feasibility prototype review session
    Address critical issues
    Deliverable: Feasibility prototype and Feasibility Prototype document
Create data warehouse prototype
    Scope the data warehouse prototype
    Determine warehouse prototyping method
    Build the warehouse prototype
        Build the prototype warehouse data propagation method
        Build the prototype warehouse data aggregation method
        Build the prototype warehouse data analysis method
        Build the prototype warehouse end-user query methods
    Run the warehouse prototype
    Conduct warehouse prototype review sessions
        Address critical issues
    Update system design documents
    Deliverable: Warehouse Prototype document
Create package integration prototype
    Scope the package prototype
    Determine package prototyping method
    Build the package prototype
    Run the package prototype
        Develop prototype scripts
        Run the prototype scripts
    Conduct package prototype review sessions
    Address critical issues
    Update system design documents
    Deliverable: Package Prototype document
Review prototyping process
    Conduct prototype process review session
    Refine the prototyping process
    Deliverable: Process Review document
Perform package integration verification
    Verify package database connectivity
    Verify database transactions
    Verify feeds and speeds
    Verify functionality of integration points
    Verify tool suite
    Verify system management interfaces
    Verify GUI usability
    Verify data conversion capabilities
    Deliverable: Package Verification and Package Implementation Verification document
Integrate vendor package
    Implement package database connectivity
    Implement database transactions
    Configure package feeds
    Configure package integration points
        Develop batch programs
    Start up system management monitors
    Perform data conversions
    Verify data conversion capabilities
    Deliverable: Package Integration and Package Integration document
Build physical database
    Convert data model to physical database design
        Review data model
        Review database standards
        Map entities to tables
        Map attributes to table columns
        Add application-specific parameter tables to the database
        Define column-level data integrity rules Define referential integrity rules
Define physical storage parameters for the tables
Define database replication
Optimize database design for performance
    Identify frequent and time-critical transactions
    Define indexes to optimize retrieval
    If necessary, denormalize table to optimize transactions
    Distribute tables and indexes across disk volumes to balance I/O loads
Generate database definition language and load database
Setup database replication mechanism
Setup database security
Setup test data for the developers
Deliverable: Installed physical database and Physical Database document
Implement the database transactions
    Define database transactions
    Prioritize the transactions in order of importance
    Review database access performance guidelines
    Code database transactions
    Optimize the transactions
    Deliverable: Completed database transactions and Database Transactions document
Build reusable business objects
    Review coding standards
    Review corporate business processes to be automated
    Review object analysis model
    Define requirements for reusable business objects
    Build reusable business object classes
    Refine reusable business object classes
    Optimize reusable business object classes for performance
    Deliverable: Complete the reusable business objects and the Business Object Document.
Code the business logic
    Review coding standards
    Review corporate business rule document
    Implement corporate business rules as server level rules and stored procedures
    Review data flow diagram
    Map processes to application procedures
    Confirm that all processes are mapped to application procedures
    Code application procedures
    Implement application-level security if necessary
    Deliverable: Completed business logic code and Business Logic document
Customize the package data structures
    Select a database customization strategy
    Review corporate business rule document
    Customize the package's data structures on the server
    Review ER diagram
    Customize the data structures on the client or application side
    Re-implement package security if necessary
    Deliverable: Customized package data structures and Package Data Structures document
Customize the package business logic
    Select a package customization strategy
    Review corporate business rule document
    Customize the package's business logic at the server level
    Implement corporate business rules as server level integrity and stored procedures
    Review data flow diagram
    Map processes to application procedures
    Confirm that all processes are mapped to application procedures
    Customize the business logic on the client or application side
    Re-implement package security if necessary
    Deliverable: Customized package business logic code and Package Business Logic document
Build reusable GUI objects
    Define standards for reusable GUI objects
    Review user interface model and identify candidates for reuse
    Build reusable GUI objects
    Refine reusable GUI object classes
    Optimize reusable object classes for performance
    Deliverable: Complete the reusable GUI objects and the GUI Object Document
Develop GUI interface
    Review GUI interface standards
    Review GUI presentation model
    Review GUI performance guidelines
    Review GUI screen prototypes
    Review security requirements Review user task analysis document
Model screen flow from process flow model
Build GUI interface
Implement GUI level security if necessary
Optimize GUI interface for performance
Design reports
Write reports
Deliverable: Completed GUI interface code and GUI Interface document
Build data warehouse monitor
    Review GUI interface standards
    Select activities to monitor
    Review GUI performance guidelines
    Review GUI screen prototypes
    Review security requirements
    Verify the operational data to be moved into the data warehouse
    Finalize the user interface
    Build GUI interface
    Implement GUI level security if necessary
    Optimize GUI interface for performance
    Finalize design of reports
    Write reports
    Deliverable: Completed Data Warehouse Monitor
Implement data conversion
    Define data mapping between the legacy data and the relational data
    Check the legacy data for integrity or missing information
    Resolve data integrity issues
    Code data conversion procedures
    Setup batch programs to automate execution of the conversion procedures
    Deliverable: Completed data conversion and Data Conversion document
Create on-line help
    Review On-line Help requirements
    Determine methods of presentation
    Define Help topics and contents
    Code On-line Help facility
    Build Help glossary
    Deliverable: Completed On-line Help and On-line Help document
Create batch processes
    Review batch processing requirements
    Setup required software component for batch processing
    Partition jobs into related groups
    Define job dependencies among job groups
    Setup batch jobs
    Test and monitor batch jobs
    Deliverable: Completed batch processing code and Batch Processing document
Implement production support
    Develop user documentation
    Train users on the system
    Develop operation manual
    Develop application maintenance manual
    Setup help desk service
    Deliverable: Production support implemented and Production Support document
Perform unit testing
    Test GUI interface
    Test business logic
    Test database integrity
    Deliverable: Completed Unit Testing and Unit Test Results document
Perform usability testing
    Setup a usability testing lab
    Select test candidates
    Conduct usability tests
    Review results and user feedback
    Modify application based on usability test results
    Deliverable: Completed Usability Testing and Usability Test Results document
Perform system fault-tolerance testing
    Review system fault-tolerance test plan
    Perform system fault-tolerance test
    Deliverable: Completed System Fault-Tolerance test
Perform system integration testing
    Conduct test plan review session
    Develop integration test code and data
    Perform System Integration Testing Review test results with the development team
Deliverable: Completed System Integration Testing and Integration Test Results document
Perform security testing
    Conduct test plan review session
    Perform security test
    Review test results with the development team
    Test system fault-tolerance
    Test overall reliability of system security
    Deliverable: Completed System Security Testing and System Security Test Results document
Implement the production environment
    Setup production hardware and software
    Setup production database
    Migrate legacy data
    Install application
    Implement database security
    Implement network security
    Implement performance monitoring procedures
    Cutover to the new system
        Run existing system in parallel until the new system is stable
        Validate the new system
        Complete cutover - shutdown old system
    Deliverable: Fully implemented system and Production Implementation document
Perform ROI analysis
    Analyze completed project against stated goals
    Determine actual benefits against planned benefits
    Determine actual costs against estimated costs
    Deliverable: Completed ROI analysis and Return On Investment document
Review implementation process
    Conduct implementation process review session
    Refine the implementation process
    Deliverable: Process Review document

We claim:

1. A method for estimating an effort required to implement a client/server system having user-specified properties, the method comprising the steps of:

associating a plurality of related tasks into a one of a plurality of task groups;

defining a neural network having a plurality of neurodes, each neurode associated with one of said task groups;

assigning a baseline effort value to each task group;

receiving system information, from a user, relating to the user-specified properties of the client/server system;

applying rule groups of an expert system to the system information to determine an effort factor with each user-specified property, said effort factor representing the potential impact of each user-specified property on each of said task groups;

automatically determining a plurality of influence factors, each influence factor representing a correlation between one of said rule groups and one of said task groups;

determining a task group value for each task group based upon said baseline value associated with each task group, said effort factors, and said influence factors, said task group value representing an estimate of the effort required to perform the tasks in each task group; and combining said task group values to generate a system estimation value representing an estimate of the effort required to implement a client/server system having user-specified properties.

2. A system for estimating an effort required to implement, using task groups, a client/server system having user-specified properties, the system comprising:

an advisor interface module;

an inference engine;

a question module coupled to the advisor interface module for eliciting system information from a user about the user-specified properties and making it available to the inference engine;

a plurality of rule groups, each rule group disposed to receive signals from said inference engine and said question module, comprising a plurality of related rules, for estimating an effort factor for each rule group based upon a relationship between each rule group and the user-specified properties of the client/server system when one or more rules of each rule group is applied to the system information by the inference engine;

a network of neural nodes, each neural node being associated with one of the task groups, each task group including a one or more related tasks for implementing the client/server system;

a rule indirection module, coupled to the neurodes and the rule group, for coupling the effort factor of each rule group to each neurode according to an influence factor, said influence factor representing a correlation between each rule group and each task group; and a task group combination unit, coupled to said task groups and said rule indirection module, for combining a value associated with each neural node representing an estimate of an effort for completing the tasks of each task group based upon a baseline effort value, said effort factors and said influence factors, to generate an estimated effort value representing an estimation of the effort required to implement the client/server system.

3. The method of claim 1, further comprising the steps of:

receiving an actual effort value representing an actual effort expended to implement the client/server system; and adjusting said influence factor according to a difference between said actual effort value and said system estimation value.

4. The system of claim 2, further comprising a memory working area coupled to the question module and the inference engine, for storing the elicited system information and making it available to the inference engine.

5. The system of claim 2, further comprising a question rulebase coupled to the inference engine and the question module, for selecting questions for display to the user according to system information received from the user.

6. A method for estimating an effort required to implement a client/server system having user-specified properties, using a plurality of task groups, a plurality of rule groups associated with user-specified properties, and an inference engine, the method comprising the steps of:

associating a plurality of related tasks into a one of the plurality of task groups;

defining a neural network having a plurality of neurodes, each neurode associated with one of said task groups;

assigning a baseline effort value to each task group;

collecting system information about the user-specified properties;

applying the rule groups to the system information to associate an effort factor with the system information;

determining a product of the effort factor, associated with the system information, and the baseline effort value, associated with the task group; and scaling the product by an influence factor representing a correlation between the user-specified property and the task group to produce a scaled product.

7. The method of claim 6, further comprising the steps of:

receiving an actual effort value representing an actual effort expended to implement the client/server system; and adjusting the influence factor to reflect a difference between said actual effort value and the estimated effort value.

8. The system of claim 2, further comprising:

an adjusting unit, coupled to said rule indirection module, for receiving an actual effort value representing an actual effort for implementing the client/server system, and for modifying said influence factors based upon a difference between said actual effort value and said estimated effort value.

* * * * *